(12) United States Patent
Kai et al.

(10) Patent No.: US 9,973,276 B2
(45) Date of Patent: May 15, 2018

(54) OPTICAL RECEIVING DEVICE AND METHOD FOR CONTROLLING DISPERSION COMPENSATION AMOUNT

(71) Applicant: FUJITSU LIMITED, Kawasaki-shi, Kanagawa (JP)

(72) Inventors: Yutaka Kai, Kawasaki (JP); Tomoo Takahara, Kawasaki (JP); Toshiki Tanaka, Setagaya (JP); Masato Nishihara, Kawasaki (JP); Ryou Okabe, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/413,906

(22) Filed: Jan. 24, 2017

(65) Prior Publication Data
US 2017/0272161 A1   Sep. 21, 2017

(30) Foreign Application Priority Data
Mar. 18, 2016 (JP) .................................. 2016-056295

(51) Int. Cl.
*H04B 10/2507* (2013.01)
*H04B 10/079* (2013.01)
(Continued)

(52) U.S. Cl.
CPC ....... *H04B 10/2507* (2013.01); *H04B 10/079* (2013.01); *H04B 10/40* (2013.01);
(Continued)

(58) Field of Classification Search
CPC combination set(s) only.
See application file for complete search history.

(56) References Cited

U.S. PATENT DOCUMENTS

| 5,717,510 A | 2/1998 | Ishikawa et al. |
| 2002/0123851 A1* | 9/2002 | Kurooka ............ H04B 10/2513 702/69 |

(Continued)

FOREIGN PATENT DOCUMENTS

| JP | 2001-53679 | 2/2001 |
| JP | 2001-208893 | 8/2001 |

(Continued)

*Primary Examiner* — David Payne
*Assistant Examiner* — Omar S Ismail
(74) *Attorney, Agent, or Firm* — Staas & Halsey LLP

(57) ABSTRACT

An apparatus includes a receiver configured to receive a signal that has traveled an optical transmission line without returning output from an optical transmitting device and synchronize with the optical transmitting device in order to demodulate the signal; a dispersion compensator configured to compensate for wavelength dispersion caused by transmission of the signal; an acquisition circuit configured to acquire a transmitting timing at which the signal has been transmitted from the optical transmitting device; a calculation circuit configured to calculate a transmission time period from the optical transmitting device to the receiver from the transmitting timing and a receiving timing at which the signal has been received with the receiver; and an amount setting circuit configured to adjust a dispersion compensation amount of the dispersion compensator in accordance with the transmission time period.

12 Claims, 10 Drawing Sheets

(51) Int. Cl.
*H04B 10/40* (2013.01)
*H04B 10/66* (2013.01)
*H04L 7/00* (2006.01)
*H04J 3/06* (2006.01)

(52) U.S. Cl.
CPC ........... H04B 10/66 (2013.01); H04L 7/0075 (2013.01); *H04J 3/0644* (2013.01); *H04J 3/0647* (2013.01)

(56) References Cited

U.S. PATENT DOCUMENTS

| | | | |
|---|---|---|---|
| 2004/0197103 A1 | 10/2004 | Roberts et al. | |
| 2006/0269294 A1* | 11/2006 | Kikuchi | H04B 10/5051 398/161 |
| 2011/0200339 A1* | 8/2011 | Komaki | H04B 10/61 398/208 |
| 2011/0211842 A1* | 9/2011 | Agazzi | H04B 10/6971 398/141 |
| 2013/0209092 A1* | 8/2013 | Sato | H04B 10/2507 398/27 |
| 2014/0341587 A1* | 11/2014 | Nakashima | H04B 10/2572 398/115 |
| 2016/0036530 A1* | 2/2016 | Yamamoto | H04B 10/564 398/1 |

FOREIGN PATENT DOCUMENTS

| | | |
|---|---|---|
| JP | 2005-229653 | 8/2005 |
| JP | 2006-522508 | 9/2006 |
| WO | WO 2013/114629 A1 | 8/2013 |

* cited by examiner

OPTICAL RECEIVING DEVICE AND METHOD FOR CONTROLLING DISPERSION COMPENSATION AMOUNT

CROSS-REFERENCE TO RELATED APPLICATION

This application is based upon and claims the benefit of priority of the prior Japanese Patent Application No. 2016-056295, filed on Mar. 18, 2016, the entire contents of which are incorporated herein by reference.

FIELD

The embodiments discussed herein are related to an optical receiving device and a method for controlling a dispersion compensation amount.

BACKGROUND

With a recent increase in transmission traffic, the demand for higher speeds and larger capacities of optical transmission systems is increasing. In addition, when Internet of things (IoT) has moved into high gear, it is expected that more devices than those currently used would be coupled at various communication distances.

In optical transmission systems, distortions of waveforms due to wavelength dispersion and the like in transmission lines are compensated for in order to achieve higher speeds and larger capacities, and thus transmission characteristics improve.

In optical transmission systems, the wavelength dispersion value per unit length of signal light varies depending on the type of a transmission line (for example, a single mode fiber, a dispersion shifted fiber, a non-zero dispersion-shifted fiber, or the like). In addition, the wavelength dispersion amount increases in proportion to the length of a transmission line along which signal light propagates. Therefore, the wavelength dispersion amount varies depending on the distance even among transmission lines using the same fiber. Accordingly, in optical transmission systems, the wavelength dispersion amount, which varies depending on the transmission path and the type of a transmission line, has to be estimated for each system and the wavelength dispersion has to be compensated for.

A typical method for controlling a dispersion compensation amount of a tunable dispersion compensator that compensates for wavelength dispersion is, for example, a method in which sweeping is performed for a range set in advance to set the initial value of the dispersion compensation amount (for example, Japanese Laid-open Patent Publication No. 2001-208893).

With an existing tunable dispersion compensator, it takes several seconds to several tens of seconds to adjust the dispersion compensation amount for temperature adjustment or the like. Therefore, when measurement is repeated a plurality of times to set a dispersion compensation amount, it takes a long time until the setting.

SUMMARY

According to an aspect of the invention, an apparatus includes a receiver configured to receive a signal that has traveled an optical transmission line without returning output from an optical transmitting device and synchronize with the optical transmitting device in order to demodulate the signal; a dispersion compensator configured to compensate for wavelength dispersion caused by transmission of the signal; an acquisition circuit configured to acquire a transmitting timing at which the signal has been transmitted from the optical transmitting device; a calculation circuit configured to calculate a transmission time period from the optical transmitting device to the receiver from the transmitting timing and a receiving timing at which the signal has been received with the receiver; and an amount setting circuit configured to adjust a dispersion compensation amount of the dispersion compensator in accordance with the transmission time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of the relationship between the transmission capacity and the transmission distance depending on whether or not dispersion compensation is performed or whether or not a transmission loss is compensated for;

DESCRIPTION OF EMBODIMENTS

First Embodiment

Figure 1:
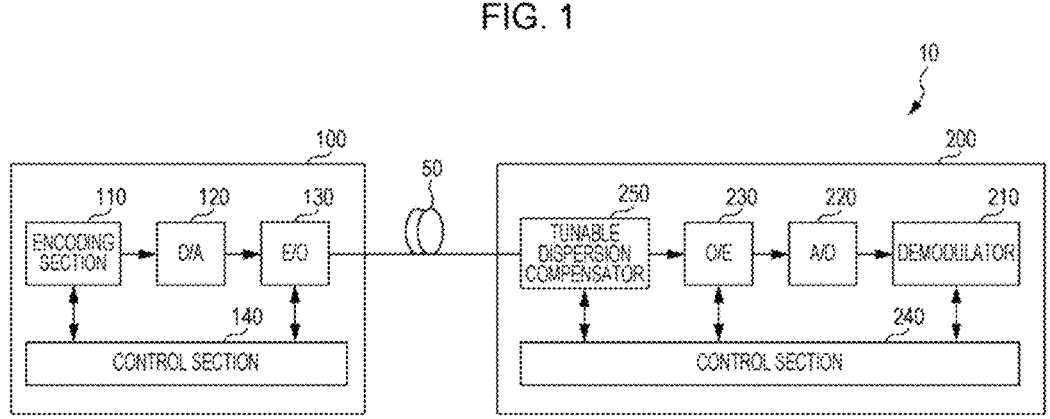
FIG. 1 is a diagram illustrating an example of a transmission system in a first embodiment.

FIG. 1 is a configuration diagram illustrating an example of a transmission system 10 in a first embodiment. The transmission system includes a transmission device 100 and a receiving device 200 coupled via a transmission line 50 such as an optical fiber. The transmitting device 100 generates signal light based on a modulation scheme from a client signal input from another device and transmits the signal light to the receiving device 200. The receiving device 200 receives signal light via the transmission line 50 from the transmission device 100 and demodulates the signal light to the original client signal. Note that the transmitting device 100 and the receiving device 200 are exemplary transmitting devices.

The transmitting device 100 includes an encoding section 110, a digital-analog (D/A) converter 120, an electrical-optical (E/O) converter 130, and a control section 140.

The encoding section 110 encodes a client signal by modulating the client signal by the use of inverse fast Fourier transform (IFFT) and signal mapping, to generate a modulated signal. Note that examples of the modulated signal include a signal modulated by discrete multi-tone (DMT) modulation, quadrature amplitude modulation (QAM), or pulse amplitude modulation (PAM). In addition, it is possible, by way of example, for the encoding section 110 to be implemented by using digital signal processing (DSP).

The D/A 120 converts a modulated signal encoded by the encoding section 110 from a digital signal to an analog signal and outputs the analog signal to the E/O 130.

The E/O 130 converts the analog signal transmitted from the D/A 120 from the electrical signal to an optical signal (signal light). The E/O 130, for example, modulates the modulated signal into signal light by using a laser diode (LD) and outputs the signal light to the transmission line 50.

The control section 140 may control the entire transmission device 100. The control section 140 performs control by transmitting and receiving control signals to and from the receiving device 200. For example, the control section 140 receives a measurement result of transmission characteristics of a probe signal from the receiving device 200, and changes the modulation scheme (by way of example, the multiple level) based on the measurement result. The probe signal is an example of a test signal composed of a plurality of subcarriers having the same signal power, and is transmitted to the receiving device 200 prior to starting the operation of the transmission system 10. In addition, the control section 140, for example, determines a path to the receiving device 200 by using probe light so as to synchronize with the receiving device 200.

The control section 140 includes, for example, a central processing unit (CPU) or a digital signal processor (DSP) as a processor, a field-programmable gate array (FPGA) or an application specific integrated circuit (ASIC) as a circuit, or the like, or any combination thereof, thereby making it possible to implement control in the transmitting device 100. The control section 140 also includes a storage medium that stores information as desired, for example, a semiconductor memory element such as random access memory (RAM), read only memory (ROM), or flash memory, or a hard disk, an optical disk, or the like (for example, ROM memory).

The receiving device 200 includes a demodulator 210, an analog-digital converter (A/D) 220, an optical-electrical converting section (O/E) 230, a control section 240, and a tunable dispersion compensator 250. A receiver, by way of example, may be formed to include the optical-electrical converter 230, the analog-digital converter 220, and the demodulator 210.

The tunable dispersion compensator 250 compensates for wavelength dispersion occurring in the transmission line 50, in accordance with control from the control section 240.

The O/E 230 converts an optical signal transmitted via the transmission line 50 from the transmitting device 100 into an electrical signal. It is possible to implement the O/E 230, for example, by a photo-diode (PD).

The A/D 220 converts the modulated signal converted into the electrical signal from an analog signal into a digital signal and outputs the digital signal to the demodulator 210.

The demodulator 210 demodulates the client signal, for example, by using demapping and fast Fourier transform (FFT).

The control section 240 perform overall control of the receiving device 200. The control section 240 transmits and receives control signals to and from the transmitting device 100 and thus performs control. For example, the control section 240 measures the transmission characteristics of a probe signal received from the transmitting device 100, and transmits the measurement result to the transmitting device 100. It is possible to implement the control section 240, for example, in such a way that the functionality in the receiving device 200 is controlled by combining a CPU with an integrated circuit such as an FPGA or an ASIC.

The operations of the receiving device 200 prior to starting operation in the transmission system 10 will be described in conjunction with the flowchart of FIG. 2.

Once the transmitting device 100 is coupled with the receiving device 200 via the transmission line 50, a control signal is received from the transmitting device 100 (step S10). Note that measurement may be performed by using, instead of the control signal, signal light that actually uses a low-speed modulation signal lower than or equal to several tens of mega-hertz (any low-speed signal light, even a multi-level signal or a non-return-zero (NRZ) signal, may be used). Performing measurement in such a manner makes it possible to effectively use a band.

Upon receiving a control signal, the receiving device 200 notifies the transmitting device 100 that the receiving device 200 is coupled with the transmitting device 100. At this point, the transmitting device 100 and the receiving device 200 establish a bidirectional communication path and synchronize with each other (step S11). Note that synchronization between the transmitting device 100 and receiving device 200 is performed in order to perform demodulation (the demodulator 210) in the receiving device 200 in accordance with an operating clock pulse that is used for encoding (the encoding section 110) performed in the transmitting device 100.

Upon establishing a path with the transmitting device 100 and synchronizing with the transmission device 100, the receiving device 200 sets the initial parameters for non-linear compensation (step S12). Note that, at this point, the transmitting device 100 performs settings in the transmitting device 100, for the frequency chirp, transmission power, wavelength, and the like.

Upon completion of the settings of non-linear parameters in step S12, the receiving device 200 again receives signal light transmitted from the transmitting device 100, measures the receiving power, and examines whether the measured receiving power is within a given range (step S13).

If the receiving power is out of the given range (No in step S13), the receiving device 200 sets parameters again (step S12). Note that if settings are changed in step S12, the setting parameters of the transmitting device 100 may be changed. In this case, at least one parameter may be changed.

If the receiving power is within the given range (Yes in step S13), the receiving device 200 again receives signal light transmitted from the transmitting device 100 and measures a transmission time period from the transmitting of the transmitting device 100 to the receiving of the receiving device 200 and the power loss associated with the transmission (step S14). As a measurement method for a transmission time period, for example, the quantity of clock pulses from the timing at which a measurement starts by using clock synchronization to the transmitting timing is included and transmitted in the signal light, and the signal is demodulated by the demodulator 210. As a result, from the quantity of clock pulses, the receiving device 200 is able to determine the transmitting time period by using a time period per clock pulse. Note that, for example, under the condition where both the devices have the same elapsed time by using tools for indicating time provided in the devices, it is possible to set the timing at which a measurement starts.

Further, the difference between the transmitting time period and a receiving time period calculated from the quantity of clock pulses from the received timing, at which the measurement starts, to the timing at which the receiving device 200 receives the signal light is determined. This makes it possible to calculate the transmission time period. Note that calculation of the transmission time period may be performed by the transmitting device 100. In this case, information of the signal light received by the receiving device 200 is transferred to the transmitting device 100.

In addition, as a measurement method for a power loss associated with transmission, it is possible to obtain the power loss as a difference between the transmitting power of the transmitting device 100 and the receiving power of the receiving device 200.

Power loss (dB)=transmitting power (dBm)−receiving power (dBm)　　　(Equation 1)

In addition, upon measuring the transmission time period, the receiving device 200 estimates a wavelength dispersion value based on the transmission time period and sets a dispersion compensation amount (step S15). Note that, specifically, the transmission speed is obtained from the transmission time period by using the refractive index of the core of a fiber used as the transmission line 50 and the transmission time period in the vacuum per meter. The transmission distance is calculated by multiplying the obtained transmission speed by the transmission time period. Once the transmission distance is calculated, the dispersion compensation amount may be calculated by multiplying the calculated transmission distance by the dispersion value per unit length in the fiber of the transmission path. In addition, if there is a remaining dispersion value, the dispersion compensation amount to be set is obtained by subtracting the remaining dispersion value from the calculated dispersion compensation amount. Note that the remaining dispersion value varies depending on a chirp set in the transmitting device 100.

After the dispersion compensation amount is calculated and set, the non-linear parameters of the receiving device 200 are readjusted (step S16), and thus preparation for operations of the receiving device 200 is complete, making it possible for the transmission system 10 to operate. Note that if the signal quality characteristics are less than or equal to given values even after the adjustment of the non-linear parameters, parameters are set again.

Setting as described above makes it possible to reduce the processing steps until the wavelength dispersion value is estimated and the dispersion compensation amount is set.

Here, a decrease in transmission capacity in wavelength dispersion will be described by using DMT modulation, which is an example of digital multi-level modulation. Note that it is assumed that the quantity of subcarriers is 1024 when DMT modulation is performed and that transmission over a single mode fiber is performed.

Figure 3A:
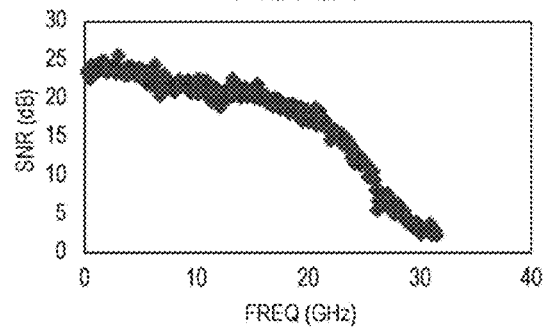
FIG. 3A to FIG. 3C are diagrams illustrating wavelength dispersion generated with DMT signals.
Figure 3B:
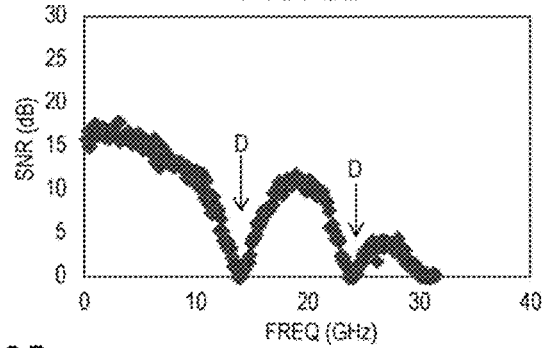
Figure 3C:
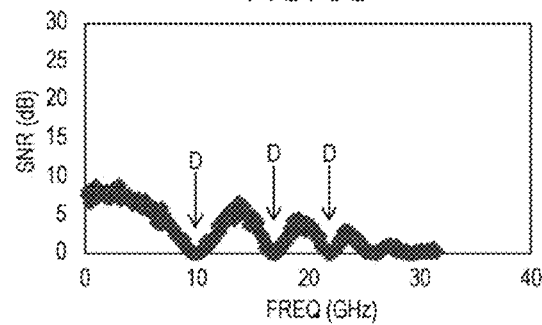

FIG. 3A depicts an example when the transmission distance is 0 km (back-to-back). In addition, FIG. 3B depicts an example when the transmission distance is 20 km, and FIG. 3C depicts an example when the transmission distance is 40 km. Note that, in FIG. 3A, FIG. 3B, and FIG. 3C, the horizontal axis represents the frequency (GHz) and the vertical axis represents the signal-noise rate (SNR) (dB). In addition, there is a relationship in which the higher the SNR, the larger the transmission capacity.

In comparison of FIG. 3A with FIG. 3B, a dip D is depicted around the 15 GHz band in FIG. 3B. This dip is generated by the influence of wavelength dispersion, and the transmission capacity decreases owing to the dip D.

In addition, comparison of FIG. 3B with FIG. 3C reveals that the dip D is moved to the position at a lower frequency. In such a manner, the dip D has a feature that the position at which the dip D is generated shifts to a lower frequency in accordance with the transmission distance. In short, the longer the transmission distance, the larger the decrease in transmission capacity caused by wavelength dispersion.

As described above, the longer the transmission distance, the larger the influence of wavelength dispersion and the more the dispersion compensation has to be performed. In particular, multi-level signals and multi-carrier signals are greatly influenced.

With a signal after DMT modulation, dispersion compensation may remove the dip D described above, making it possible to increase the transmission capacity.

Figure 4:
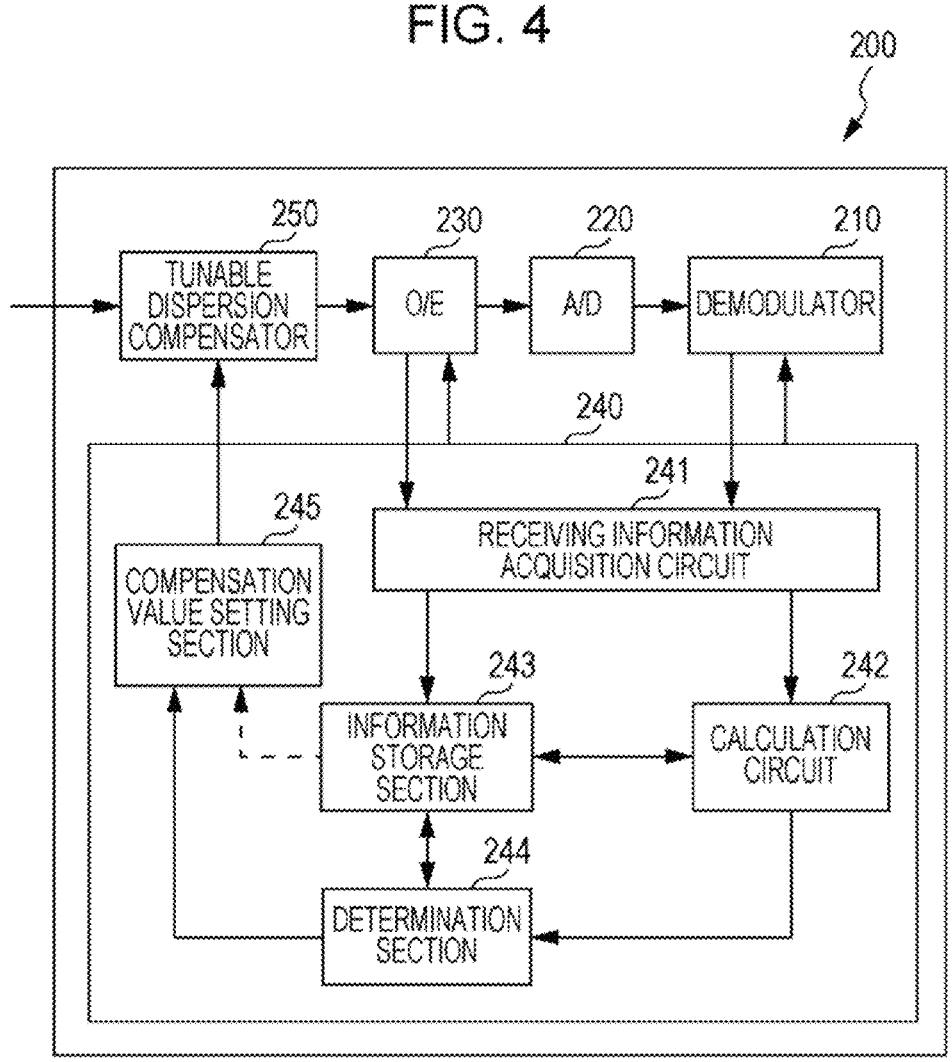
FIG. 4 is a diagram illustrating an example of a functional block diagram of a control section.

Next, the processing of the control section 240 of the receiving device 200 will be described in detail. FIG. 4 illustrates an example of a functional configuration block diagram of the control section 240. The control section 240 includes a receiving information acquisition circuit 241, a calculation circuit 242, an information storage section 243, a determination section 244, and a compensation value setting section 245.

The receiving information acquisition circuit 241 acquires information at the time when the receiving device 200 receives an optical signal. Note that examples of the receiving information to be acquired include the quantity of clock pulses counted from a certain timing and a time point. The receiving information acquisition circuit 241 also acquires, among signals demodulated by the demodulator 210, information about control transmitted from the transmitting device 100, for example, transmitting power, a transmitting time point, and a transmitting timing clock pulse.

The calculation circuit 242 calculates information about transmission, such as a transmission time period and a transmission loss. A transmission time period is calculated, for example, as a difference between the time period of a receiving timing and the time period of a transmitting timing acquired by the receiving information acquisition circuit 241.

In addition, using information stored in the information storage section 243, the calculation circuit 242 calculates the transmission distance and losses caused during transmission (a loss in wavelength dispersion and a transmission loss). Note that the losses do not have to be calculated when the relationship between the transmission distance and the loss is stored in the information storage section 243.

In addition, concerning a transmission loss, transmission power is acquired from a signal demodulated by the demodulator 210, and the power loss may be calculated as a difference between the receiving power at the time when the signal is received and the transmitting power. This makes it possible to calculate the transmission loss by using the calculated power loss and a loss in wavelength dispersion.

Figure 6:
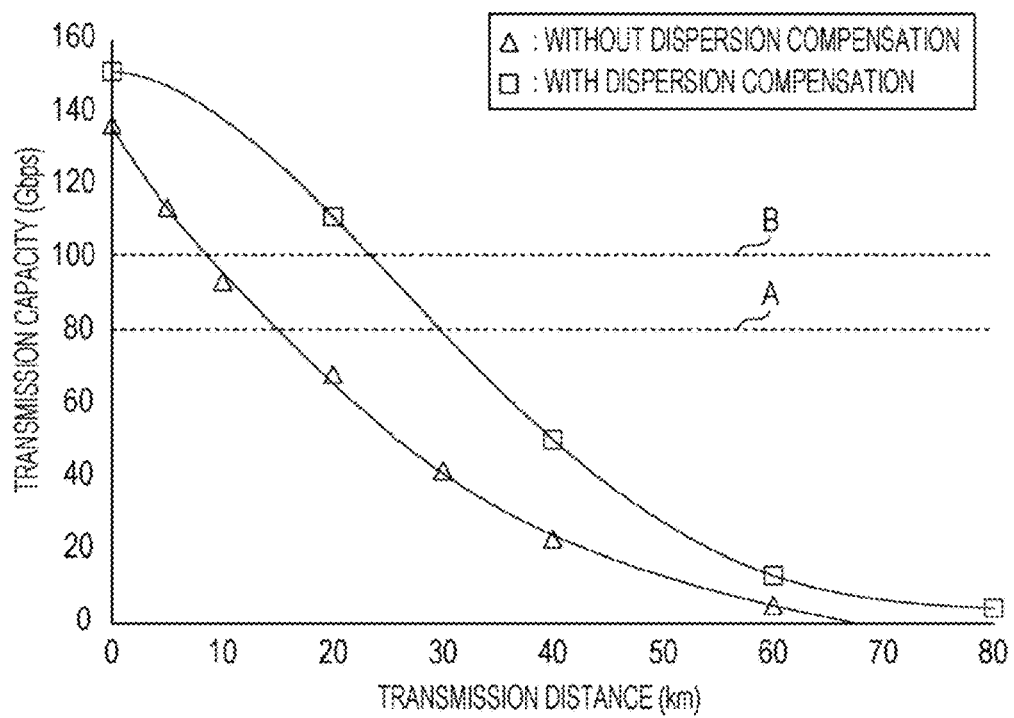
FIG. 6 is a graph depicting an example of the relationship between the transmission capacity and the transmission distance depending on whether there is dispersion compensation.

The information storage section 243 stores, for example, a dispersion value per unit of a fiber, information transmitted from the transmitting device 100, and information such as the relationship between the transmission distance and the dispersion compensation amount (the relationship as depicted in FIG. 6 to be described below). Note that the information storage section 243 corresponds to the storage medium described in the above.

The determination section 244 compares each value calculated by the calculation circuit 242 with a value stored in the information storage section 243 and makes a determination. Note that operations of the determination section 242 will be described below. Based on a result of the determination section 244, the compensation value setting unit 245 sets a dispersion compensation amount stored in the information storage section 243 (or calculated by the calculation circuit 242). Examples of the way to set a dispersion compensation amount include a method of adjusting a voltage to be applied to the tunable dispersion compensator 250.

Figure 5:
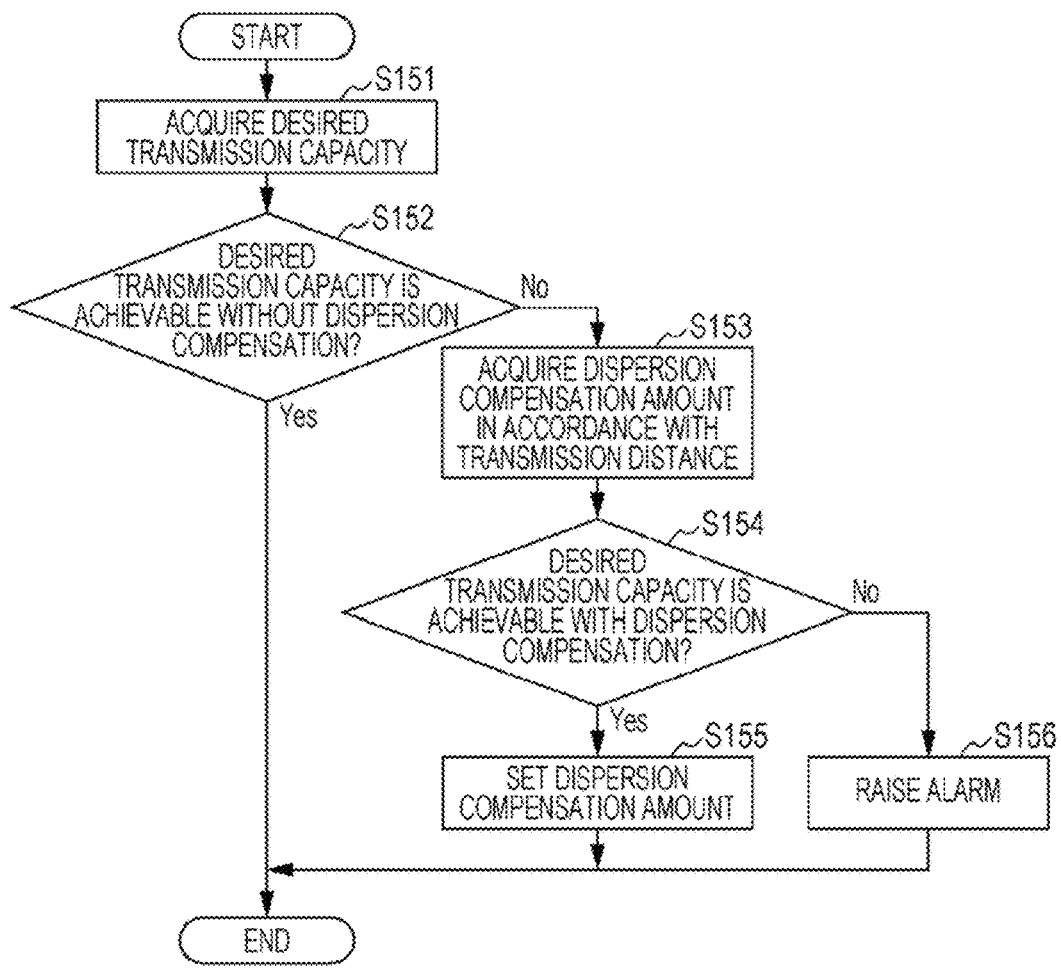
FIG. 5 is a diagram illustrating an example of a flowchart of a method for setting a dispersion compensation amount in the control section.

Here, control until setting of a dispersion compensation amount performed by the control section 240 will be described in conjunction with the flowchart of FIG. 5.

Figure 2:
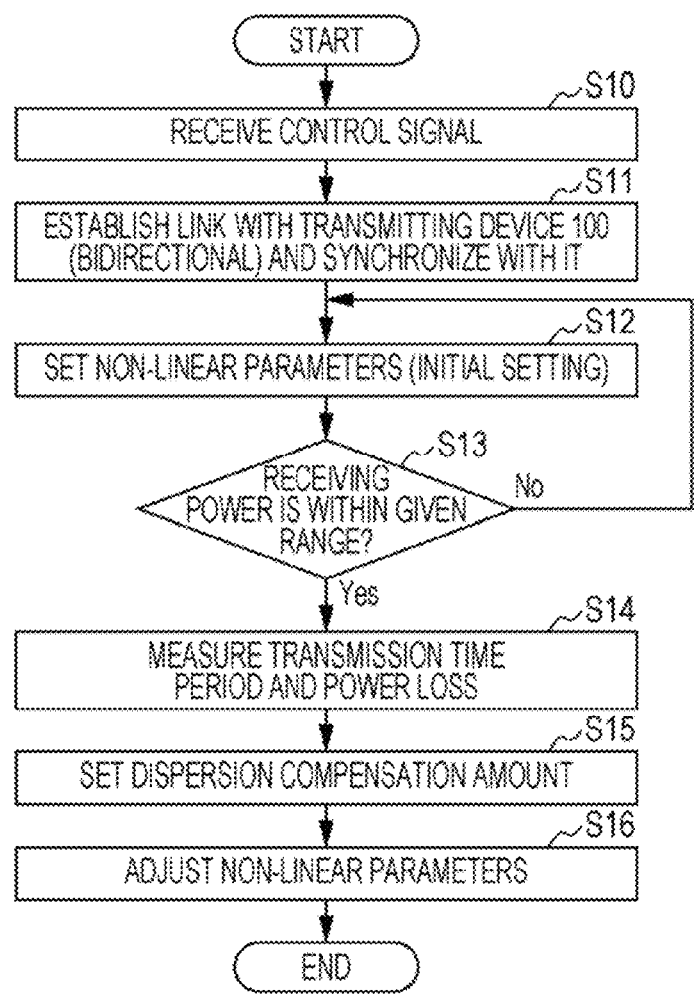
FIG. 2 is a diagram illustrating an example of a flowchart of operations of a receiving device.

Once the initial values of non-linear parameters are measured in step S14 illustrated in FIG. 2, a desired transmission capacity stored in the information storage section 243 is acquired (step S151). Note that the desired transmission capacity represents a transmission capacity desired by the transmission system 10.

Next, the determination unit 244 examines whether the desired transmission capacity is achievable under the condition where dispersion compensation is not performed from the transmission distance calculated by using a transmission time period by the calculation circuit 242 (step S152).

If the desired transmission capacity is achievable without performing dispersion compensation (Yes in step S152), the determination section 244 determines not to set a dispersion compensation amount, and the compensation value setting section 245 completes the setting of a dispersion compensation amount in accordance with the determination of the determination section 244.

If the desired transmission capacity is not achievable without performing dispersion compensation (No in step S152), the determination section 244 acquires a dispersion compensation amount in accordance with the transmission distance from the information storage section 243 (step S153) and examines whether the desired transmission capacity is achievable when dispersion compensation is performed (step S154).

If the desired transmission capacity is achievable under the condition where dispersion compensation is performed (Yes in step S154), the determination section 244 makes a determination on the setting of a dispersion compensation amount, and the compensation value setting section 245 completes the setting of a dispersion compensation amount in compliance with the determination of the determination section 244 (step S155).

If the desired transmission capacity is not achievable under the condition where dispersion compensation is performed (No in step S154), the determination section 244 determines not to set a dispersion compensation amount. Note that, on this occasion, in the current transmission system 10, the desired transmission capacity is unable to be satisfied, and thus an alarm (for example, illumination of a lamp (not illustrated in the figure)) is raised (step S156). Then, the process is complete.

Note that raising an alarm makes it possible to quickly rebuild the transmission system 10. In addition, control may be performed so as to change the desired transmission capacity to handle the situation. Note that steps S151 to S156 correspond to the step S15 illustrated in FIG. 2. If the process in step S156 is performed, setting of non-linear parameters (step S16 illustrated in FIG. 2) is not performed.

The relationship between the transmission capacity and the transmission distance will be described in conjunction with FIG. 6. FIG. 6 is a diagram depicting an example of the relationship between the transmission capacity (the vertical axis) and the transmission distance (the horizontal axis). In FIG. 6, two types of cases where dispersion compensation is performed (□) and where dispersion compensation is not performed (Δ) are depicted. Note that, in FIG. 6, it is assumed that signal light is transmitted by using a wavelength of the 1.55 nm band. Note that, concerning the relationship between the transmission capacity and the transmission distance, it is possible to perform measurement in advance (including measurement after establishment of a transmission path is confirmed) or to perform calculation by running a simulation.

In addition, the relationship between the transmission capacity and the transmission distance does not have to be handled individually for each transmitting device 100 (or each receiving device 200) if the usage parts, specifications, and the like are determined. The same relationship holds for the transmitting devices 100 with the same usage parts, specifications, and the like. Therefore, the relationship between the transmission capacity and the transmission distance is stored in advance in the information storage section 243, and after the transmission distance is calculated, the dispersion compensation amount may be set by using the stored relationship between the transmission capacity and the transmission distance.

For example, assuming that the desired transmission capacity is 80 Gbps (the dotted line A), it is seen that transmission is available for the distance up to about 15 km without dispersion compensation. In addition, dispersion compensation enables transmission to be available for the distance up to about 30 km. In short, the determination section 244 determines whether the transmission distance calculated by the calculation circuit 242 corresponds to a distance less than 15 km, a distance of 15 km up to 30 km, or a distance greater than or equal to 30 km, and sets a dispersion compensation amount when the transmission distance is a distance of 15 km up to 30 km.

Likewise, when the desired transmission capacity is 100 Gbps (the dotted line B), the determination section 244 determines whether the calculated transmission distance corresponds to a distance less than 7 km, a distance of 7 km up to 22 km, or a distance greater than or equal to 22 km, and sets a dispersion compensation amount when the calculated transmission distance corresponds to a distance of 7 km up to 22 km. Note that the set value of the dispersion compensation amount at this point is assumed to be an optimum value for each transmission distance. In short, for example, different levels of dispersion compensation are performed for transmission with transmission distances of 20 km and 10 km.

As described above, by using a dispersion compensation amount, it is determined whether to perform dispersion compensation, and thus the dispersion compensation may be handled in accordance with a system. This makes it possible to perform communication without performing dispersion compensation when short-distance coupling is established (when a desired transmission capacity may be obtained without dispersion compensation).

In addition, in some cases, the wavelength dispersion value using a transmission distance estimated by using the transmitting time period and the receiving time period does not match the wavelength dispersion value generated in the actual transmission. This mismatch is not recognized unless measurement is performed by using a dispersion compensation amount set actually. Therefore, around the desired transmission capacity, for example, in the range of 5 Gbps around the desired transmission capacity, the transmission capacity is satisfied in some cases and is not satisfied in other cases.

Accordingly, around the desired transmission capacity, after a dispersion compensation amount is once set, the dispersion compensation amount is moved back and forth and measurement is performed, so that the dispersion compensation amount is set to an optimum value. Under this condition, it is examined whether or not the desired transmission capacity is satisfied. This makes it possible to reduce careless setting changes and to reduce setting changes after starting of operation of the system.

In addition, a loss range in accordance with a transmission distance is stored in the information storage unit 243. When a transmission loss calculated by the calculation circuit 242 is out of the loss range, an alarm is raised to indicate that there is an error in the transmission environment (circumstances for transmission such as coupling of connectors and the states of fibers). At this point, a different alarm may be used to differentiate it from an alarm used for the case where a desired transmission capacity is not satisfied even with dispersion compensation. This differentiation makes it clear how to handle an error, and thus makes it possible to quickly correct the error.

As described above, in the first embodiment, it has been discussed that a dispersion compensation amount is calculated from a transmission time period between the transmitting device 100 and the receiving device 200, and thus the time period for adjustment until a dispersion compensation amount is set (until the system is started) may be reduced compared with an existing method (a method in which sweeping is performed to detect an optimum value).

In addition, when an increase in the loss due to degradation or the like of a fiber (an example of the transmission line 50) occurs while the system is operating after operation of the system has been started, and dispersion compensation is not performed, performing dispersion compensation makes it possible to satisfy the desired transmission capacity, making it possible to extend the life of a product.

In addition, since multi-level modulation is performed, the transmission capacity may change to a variable transmission capacity. Thus, it is possible to set a desired transmission capacity in accordance with the degradation and to determine dispersion compensation. Therefore, it becomes possible to handle changes while the system is operating. In addition, variable design in consideration of a transmission capacity and power consumption (power for controlling the tunable dispersion compensator 250) becomes possible.

In addition, the wavelength dispersion value is characterized by the wavelength dispersion value varying for each chirp under the influence of variations in the remaining dispersion value. For example, when the relationship between the transmission capacity and the transmission distance is stored in the information storage unit 243, each relationship between the transmission capacity and the transmission distance that corresponds to one of chirps has to be stored. In short, a plurality of relationships between transmission capacities and transmission distances corresponding to the respective chirps have to be stored. Accordingly, the amount of information to be stored in the information storage section 243 increases. Therefore, for example, the relationship between the transmission capacity and the transmission distance is held for half of all the chirps in the information storage unit 243. When a dispersion compensation amount is set with a chirp corresponding to the relationship that is not held in the information storage unit 243, calculation is made by the calculation circuit 242 by using data on a chirp corresponding to the relationship that is held in the information storage unit 243. Thus, the amount of information to be stored in the information storage section 243 may be reduced.

Modification of First Embodiment

Figure 7:
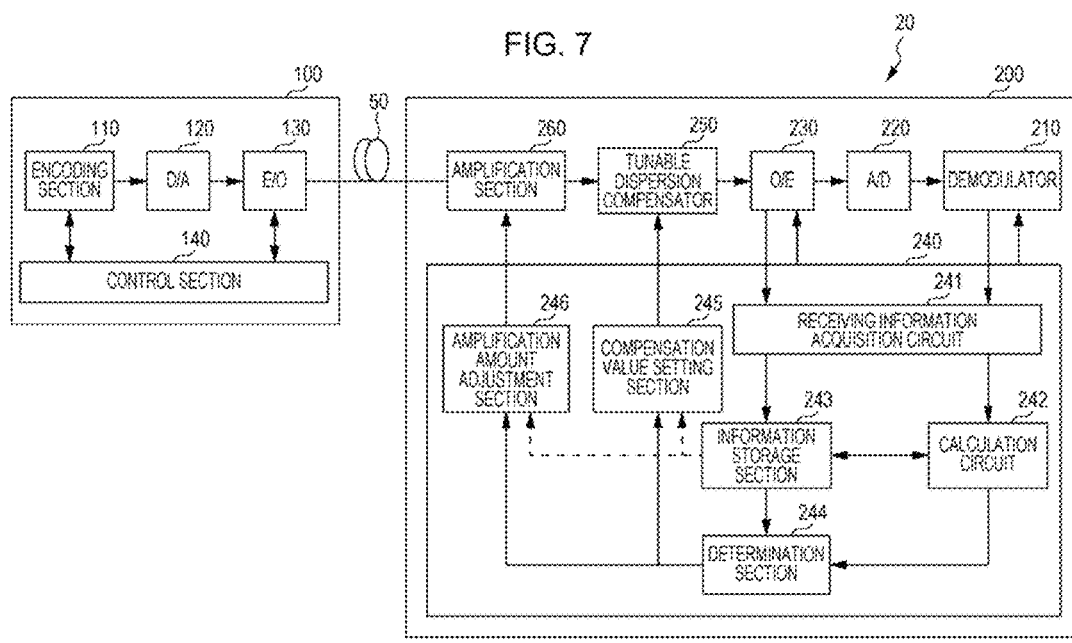
FIG. 7 is a diagram illustrating an example of a transmission system of a modification of the first embodiment.

FIG. 7 illustrates a functional block diagram of an example of a transmission system 20 of a modification of the first embodiment. The transmitting device 100 illustrated in FIG. 7 is as illustrated in FIG. 1. In addition, the receiving device 200 illustrated in FIG. 7 includes an amplification section 260 and an amplification amount adjustment section 246 in addition to the configurations illustrated in FIG. 1 and FIG. 4.

The amplification section 260 amplifies signal light that is input in accordance with control of the amplification amount adjustment section 246 (functionality in the control section 240). Examples of the amplification unit 260 include an optical fiber doped with a rare-earth element such as erbium.

The amplification amount adjustment section 246 adjusts the amplification amount (gain) in accordance with control from the determination section 244. In particular, the amplification amount in the amplification section 260 may be adjusted by controlling a drive voltage to be applied to the amplification section 260. Note that the relationship between the transmission distance and the loss is stored in the information storage section 243, and the amplification amount may be changed based on information in the information storage section 243.

The determination section 244 determines a dispersion compensation amount and an amplification amount based on values calculated by the calculation circuit 242.

Figure 8:
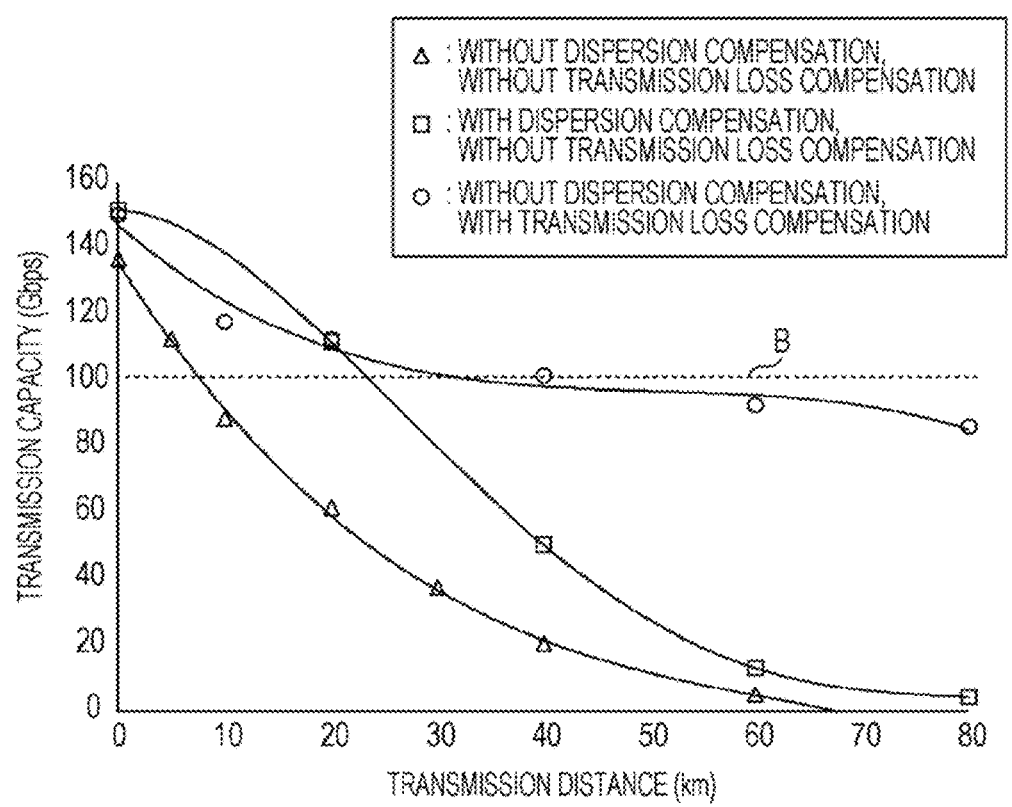

In conjunction with FIG. 8, the relationship between the transmission capacity and the transmission distance in consideration of amplification will be described. Note that FIG. 8 illustrates the case (0) where all of the transmission loss is compensated for (dispersion compensation is not performed) in addition to the conditions illustrated in FIG. 6. Note that the squares in the figure indicate the case where dispersion compensation is performed and the transmission loss is not compensated for, and the triangles in the figure indicate the case where neither dispersion compensation is performed nor the transmission loss is compensated for.

For example, it is seen that, assuming that the desired transmission capacity is 100 Gbps (the dotted line B), for a transmission distance of 22 km up to 40 km, only compensating for the transmission loss makes it possible to satisfy the desired transmission capacity.

In addition, for a transmission distance greater than or equal to 40 km, control of only one of the tunable dispersion compensator 250 and the amplification section 260 does not satisfy the desired transmission capacity, and therefore both of the tunable dispersion compensator 250 and the amplification section 260 have to be controlled.

In addition, for a transmission distance less than 40 km, control may be performed by combining the tunable dispersion compensator 250 with the amplification section 260 as mentioned above. However, amplified spontaneous emission (ASE) noise generated in the amplification section 260 has to be taken into account. In addition, with a combination of control of the amplification section 260 and the tunable dispersion compensator 250, for example, for minimizing drive power for controlling each of the amplification section 260 and the tunable dispersion compensator 250, control is performed so as to satisfy the desired transmission capacity. This makes it possible to perform transmission while keeping the power consumption to a minimum. Note that these operations are executed by each functionality of the control unit 240 under instructions from the determination unit 244.

As described above, addition of the amplification section 260 to the receiving device 200 expands the range in which the desired transmission capacity is satisfied, and thus facilitates dealing with various applications. In addition, with a combination of control that minimizes the drive power of the amplification section 260 and the tunable dispersion compensator 250, power consumption may be kept to a minimum.

Second Embodiment

In the first embodiment, the method has been discussed in which the transmission path between the transmitting device 100 and the receiving device 200 is secured, the transmission time period, the transmission distance, and the dispersion compensation amount are calculated by making use of synchronization of operating clock pulses, and the dispersion compensation amount is set.

In the second embodiment, a method using a synchronous network such as a global positioning system (GPS), the synchronous digital hierarchy (SDH), or the like will be discussed.

Figure 9:
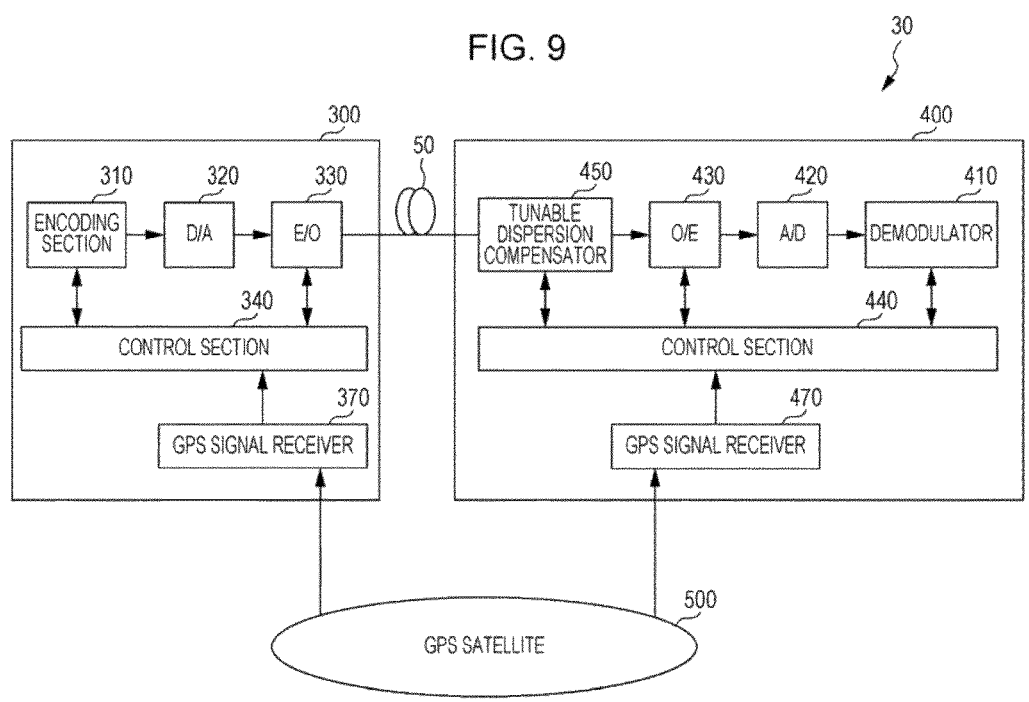
FIG. 9 is a diagram illustrating an example of a configuration of a transmission system in a second embodiment.

FIG. 9 is a configuration diagram illustrating an example of a transmission system 30 in the second embodiment. The transmission system 30 includes a transmitting device 300, a receiving device 400, and a GPS satellite 500. Note that the GPS satellite 500 is an example of a synchronous network, and the synchronous network used here is not limited to this.

In addition, the transmitting device 300 and the receiving device 400 are coupled via the transmission line 50 as in the first embodiment. In addition, the GPS satellite 500 is coupled wirelessly with the transmitting device 300 and the receiving device 400.

The transmitting device 300 includes an encoding section 310, a D/A 320, an E/O 330, a control section 340, and a GPS signal receiver 370. The encoding section 310, the D/A 320, and the E/O 330 are similar to the encoding section 110, the D/A 120, and the E/O 130 illustrated in FIG. 1, and therefore description thereof is omitted.

The control section 340 controls each functionality of the transmitting device 300 based on a signal received by the GPS signal receiver 370, in addition to the functionality of the control section 140 illustrated in FIG. 1. Specifically, the control section 340 transmits a signal to the receiving device 400 based on a GPS signal received from the GPS satellite 500.

The GPS signal receiver 370 receives a GPS signal from the GPS satellite 500 and issues an instruction to the control section 340 based on the received GPS signal. Specifically, the GPS signal receiver 370 extracts information such as a transmitting timing from the GPS signal received from the GPS satellite 500 and sends the extracted information to the control section 340.

The receiving device 400 includes a demodulator 410, an A/D 420, an O/E 430, a control section 440, a tunable dispersion compensator 450, and a GPS signal receiver 470. The demodulator 410, the A/D 420, the O/E 430, the tunable dispersion compensator 450 are similar to the demodulator 210, the A/D 220, the O/E 230, the tunable dispersion compensator 250 illustrated in FIG. 1, and therefore description thereof is omitted.

The control section 440 calculates a transmission time period, a transmission distance, a dispersion compensation amount, and the like based on GPS signals received by the GPS signal receiver 470, and controls the dispersion compensation amount of the tunable dispersion compensator 450, in addition to the functionality of the control section 140 illustrated in FIG. 1.

The GPS signal receiver 470 receives a GPS signal from the GPS satellite 500 and issues an instruction to the control unit 440 based on the received GPS signal. Specifically, the GPS signal receiver 470 extracts information, such as a timing at which the transmitting device 300 has transmitted a signal, included in the received GPS signal, and sends the extracted information to the control section 440.

The GPS satellite 500 sends GPS signals to the transmitting device 300 and the receiving device 400. Specifically, for example, the GPS satellite 500 notifies the transmitting device 300 and the receiving device 400 of a clock pulse, which functions as a transmitting timing of signal light to be transmitted from the transmitting device 300 to the receiving device 400, and transmitting power by using GPS signals.

As discussed above, in the second embodiment, using the GPS satellite 500 makes it possible to calculate a transmission time period or the like without demodulating signals when the transmission time period or the like is calculated.

Third Embodiment

In the first and second embodiments, the method has been discussed in which signal light in its original state undergoes dispersion compensation before the signal light is converted into an electrical signal, and the signal light that has undergone dispersion compensation is converted into an electrical signal and is subjected to processing. In a third embodiment, a method will be discussed in which dispersion compensation is performed after the signal light has been converted into an electrical signal.

Figure 10:
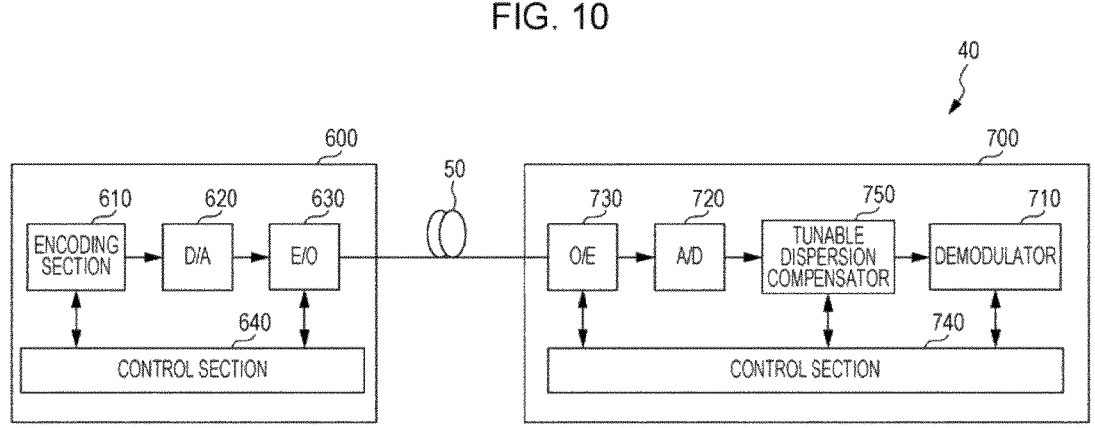
FIG. 10 is a diagram illustrating an example of a configuration of a transmission system in a third embodiment.

FIG. 10 is a configuration diagram illustrating an example of a transmission system 40 in the third embodiment. The transmission system 40 includes a transmitting device 600 and a receiving device 700. In addition, the transmitting device 600 and the receiving device 700 are coupled via the transmission line 50 as in the first and second embodiments.

The transmitting device 600 includes an encoding section 610, a D/A 620, an E/O 630, and a control section 640. The encoding section 610, the D/A 620, the E/O 630, and the control section 640 are similar to the encoding section 110, the D/A 120, the E/O 130, and the control section 140 illustrated in FIG. 1, and therefore description thereof is omitted.

The receiving device 700 includes a demodulator 710, an A/D 720, an O/E 730, a control section 740, and a tunable dispersion compensator 750. The demodulator 710, the A/D 720, the O/E 730, and the control section 740 are similar to the demodulator 210, the A/D 220, the O/E 230, and the control section 240 illustrated in FIG. 1, and therefore description thereof is omitted.

The tunable dispersion compensator 750 compensates for wavelength dispersion for a signal that has been converted into an electrical signal by the O/E 730. The tunable dispersion compensator 750, for example, may adjust a dispersion compensation amount in such a way that the control section 740 controls each of a plurality of tap voltages.

Note that, in the transmission system 40, calculation of a dispersion compensation amount and other processing are performed as discussed above.

As discussed above, in the third embodiment, concerning dispersion compensation in the electrical processing, calculation of a dispersion compensation amount or the like is possible as in the first embodiment.

As described above, although desirable embodiments of the present disclosure have been described, the present disclosure is not limited to the above description. It will be apparent that various modifications and changes may be made by those skilled in the art based on the scope and spirit of the present disclosure described in the claims or disclosed in the embodiments for carrying out the present disclosure. It will be appreciated that such modifications and changes are included in the scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical reception device comprising:
a memory including a first relationship between a wavelength, a transmission distance, and a wavelength dispersion amount;
a receiver configured to receive a signal that has traveled an optical transmission line without returning output from an optical transmission device and synchronize with the optical transmission device in order to demodulate the signal;
a dispersion compensator configured to compensate for wavelength dispersion caused by transmission of the signal;
an acquisition circuit configured to acquire a transmission timing at which the signal has been transmitted from the optical transmission device;
a calculation circuit configured to calculate a transmission time period from the optical transmission device to the receiver from the transmission timing and a reception timing at which the signal has been received with the receiver and obtain a transmission distance from the transmission time period; and
an amount setting circuit configured to adjust a dispersion compensation amount of the dispersion compensator in accordance with the transmission time period and set the dispersion compensation amount based on the transmission distance obtained by the calculation circuit and information stored in the memory.

2. The optical reception device according to claim 1, wherein the memory includes a plurality of the first relationships that correspond to a plurality of chirps, and
wherein, for the transmission device having a chirp that corresponds to one of the first relationships that is not included in the information storage unit, the calculation circuit is configured to obtain the dispersion compensation amount by using one of the chirps that corresponds to one of the first relationships that is included in the information storage unit.

3. The optical reception device according to claim 1, further comprising a determination section configured to determine whether to compensate dispersion in order to receive the signal transmitted from the optical transmission device with a desired transmission capacity, the determination section including a central processor unit with an integrated circuit,
wherein the dispersion compensator is configured to perform dispersion compensation in accordance with a determination result of the determination section.

4. The optical reception device according to claim 3, wherein the determination section is configured to raise an alarm once the determination section determines that, even when dispersion compensation is performed for the desired transmission capacity, the dispersion compensation does not satisfy the desired transmission capacity.

5. The optical reception device according to claim 3, wherein the determination section is configured to adjust the dispersion compensation amount back and forth to determine whether a dispersion compensation amount resulting from the adjusting satisfies the desired transmission capacity, when a given difference from the desired transmission capacity exists when dispersion compensation is performed for the desired transmission capacity.

6. The optical reception device according to claim 1, wherein the calculation circuit configured to calculate, from the transmission time period, a first transmission loss that is an expected transmission loss and a second transmission loss that is an actual transmission loss caused by transmission of the signal, and configured to compare the first transmission loss with the second transmission loss to detect an error when there is a difference greater than or equal to a given value.

7. The optical reception device according to claim 1, wherein the receiver is configured to receive the signal including first clock information for indicating a transmission timing, and
wherein the acquisition circuit is configured to acquire the transmission timing from the first clock pulse.

8. The optical reception device according to claim 1, further comprising a synchronous information receiver configured to receive synchronous information,
wherein the transmission timing is acquired from the synchronous information.

9. The optical reception device according to claim 1, wherein the receiver is configured to include an optical-electrical converter, an analog-digital converter, and a demodulator.

10. The optical reception device according to claim 1, wherein the signal that is used for measuring the transmission time period is a low-speed modulation signal.

11. An optical reception device comprising:
a memory including a first relationship between a wavelength, a transmission distance, and a wavelength dispersion amount;
a receiver configured to receive a signal that has traveled an optical transmission line without returning and synchronize with the optical transmission device in order to demodulate the signal;
a dispersion compensator configured to compensate for wavelength dispersion generated by transmission; and
a processor comprising:
an acquisition circuit configured to acquire a transmission timing at which the signal is transmitted from the optical transmission device,
a calculation circuit configured to calculate a transmission time period from the optical transmission device to the receiver from the transmission timing and a reception timing at which the signal is received by the receiver and obtain a transmission distance from the transmission time period, and an amount setting circuit configured to adjust a dispersion compensation amount of the dispersion compensator in accordance with the transmission time period and set the dispersion compensation amount based on the transmission distance obtained by the calculation circuit and information stored in the memory, wherein the processor includes a central processing unit, a field-programmable gate array, or an application specific integrated circuit, or any combination thereof.

12. A method for controlling a dispersion compensation amount in a dispersion compensator configured to compensate for a distortion in waveform caused by wavelength dispersion in an optical reception device configured to synchronize with an optical transmission device in order to demodulate a signal and include a memory including a first relationship between a wavelength, a transmission distance, and a wavelength dispersion amount, the method comprising:

acquiring a transmission timing at which a signal is transmitted from the optical transmission device;

calculating a transmission time period from the transmission timing and a reception timing at which the signal is received after the signal has traveled an optical transmission line without returning and obtaining a transmission distance from the transmission time period; and adjusting a dispersion compensation amount for compensating for wavelength dispersion with the dispersion compensator in accordance with the transmission time period and setting the dispersion compensation amount based on the transmission distance obtained by the calculation circuit and information stored in the memory.

* * * * *